(12) United States Patent
Dhaussy et al.

(10) Patent No.: US 11,852,065 B2
(45) Date of Patent: Dec. 26, 2023

(54) ATTACHMENT DEVICE FOR A MODULE FOR DISPENSING AN AQUEOUS SOLUTION CONTAINED IN A TANK ON BOARD A MOTOR VEHICLE

(71) Applicant: Plastic Omnium Advanced Innovation and Research, Brussels (BE)

(72) Inventors: Franck Dhaussy, Brussels (BE); Stephane Leonard, Brussels (BE); Laurent Duez, Brussels (BE); Simon Jeanneteau, Brussels (BE); Franck Lecrivain, Brussels (BE); Yann Sinault, Brussels (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 0 days.

(21) Appl. No.: 17/441,970

(22) PCT Filed: Jun. 1, 2020

(86) PCT No.: PCT/EP2020/065111
§ 371 (c)(1),
(2) Date: Sep. 22, 2021

(87) PCT Pub. No.: WO2020/240036
PCT Pub. Date: Dec. 3, 2020

(65) Prior Publication Data
US 2022/0195905 A1    Jun. 23, 2022

(30) Foreign Application Priority Data
May 31, 2019   (FR) ...................... 19 05826

(51) Int. Cl.
*F01N 3/00* (2006.01)
*F01N 3/20* (2006.01)

(52) U.S. Cl.
CPC ........ *F01N 3/2066* (2013.01); *F01N 2530/18* (2013.01); *F01N 2610/02* (2013.01);
(Continued)

(58) Field of Classification Search
CPC ............... F01N 3/2066; F01N 2530/18; F01N 2610/02; F01N 2610/10; F01N 2610/1406; F01N 2610/1433
See application file for complete search history.

(56) References Cited

U.S. PATENT DOCUMENTS 6,063,350 A * 5/2000 Tarabulski ......... B01D 53/9495
423/239.1
8,850,797 B2 * 10/2014 Dougnier .............. F01N 3/2896
60/286

(Continued)

FOREIGN PATENT DOCUMENTS

CN    102365460 A    2/2012
CN    103016338 A    4/2013
(Continued)

OTHER PUBLICATIONS

English language translation of the Notice of Grounds for Rejection dated Dec. 2, 2021 in Korean Patent Application No. 10-2021-7037922, 7 pages.
(Continued)

*Primary Examiner* — Matthew T Largi
(74) *Attorney, Agent, or Firm* — Oblon, McClelland, Maier & Neustadt, L.L.P.

(57) ABSTRACT

The invention relates to an attachment device (1) for a module for dispensing an aqueous solution contained in a tank on board a motor vehicle.
According to the invention, such an attachment device (1) comprises a pump stator (31), a heating means and a heat diffuser (14) which comprises a base (15) and a first plurality
(Continued)

Figure 1:
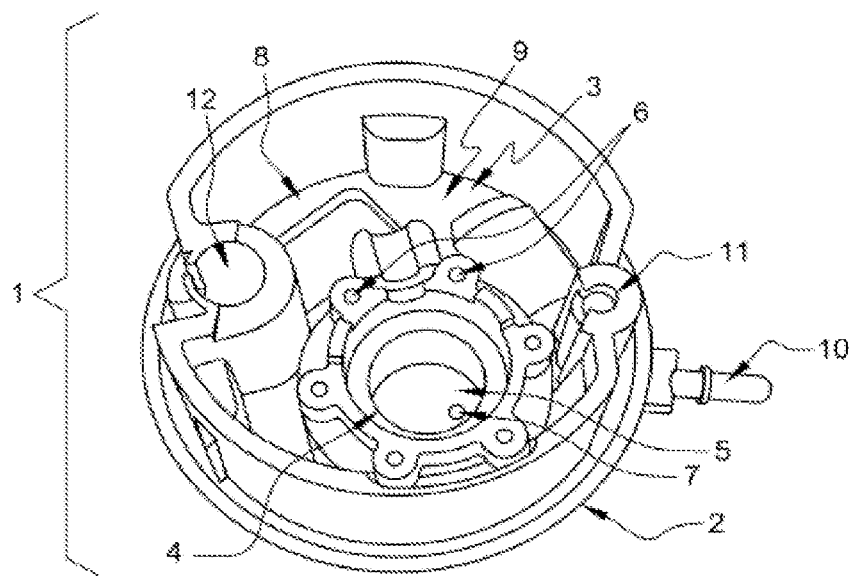

of walls (16) that are substantially vertical with respect to said base (15) and define at least one first internal volume (3, 17), said base (15) and/or at least one wall that is substantially vertical with respect to the base (15) comprising at least one means (18) for positioning the pump stator and/or a first means (19) for attaching the pump stator and/or at least one second means (20) for attaching the heating means, the pump stator (31) and heat diffuser (14) assembly being overmolded with a plastic material, the attachment device (1) comprising at least one first through-hole (21), preferably in the region of the base of the attachment device (1), suitable for discharging the aqueous solution pumped by the pump, and a second through-hole (22) suitable for supplying the pump with aqueous solution.

19 Claims, 4 Drawing Sheets

(52) U.S. Cl.
CPC .. *F01N 2610/10* (2013.01); *F01N 2610/1406* (2013.01); *F01N 2610/1433* (2013.01)

(56) References Cited

U.S. PATENT DOCUMENTS

| | | | | |
|---|---|---|---|---|
| 9,074,610 | B2* | 7/2015 | Harr | B01D 35/027 |
| 9,488,368 | B2* | 11/2016 | Schlenke | F01N 3/2066 |
| 9,546,034 | B2* | 1/2017 | Landes | F01N 3/2066 |
| 9,702,287 | B2* | 7/2017 | Landes | B01D 35/18 |
| 10,753,254 | B2* | 8/2020 | Lorenz | F01N 3/208 |
| 2009/0230136 | A1* | 9/2009 | Dougnier | F01N 3/2066 |
| | | | | 220/592.01 |
| 2013/0263941 | A1 | 10/2013 | Landes et al. | |
| 2013/0269789 | A1* | 10/2013 | Fromont | F01N 3/2066 |
| | | | | 137/59 |
| 2016/0101947 | A1* | 4/2016 | Himmelmann | F04D 29/4226 |
| | | | | 406/88 |
| 2016/0258321 | A1 | 9/2016 | Thompson et al. | |
| 2016/0265406 | A1* | 9/2016 | Ryu | F01N 3/2066 |
| 2017/0334289 | A1 | 11/2017 | Ganthaler et al. | |
| 2018/0045098 | A1* | 2/2018 | Hwang | B60K 15/03 |
| 2019/0112954 | A1* | 4/2019 | Lee | F01N 3/2066 |

FOREIGN PATENT DOCUMENTS

| | | | |
|---|---|---|---|
| CN | 103373542 | A | 10/2013 |
| DE | 10 2010 062 982 | A1 | 6/2012 |
| EP | 3 263 861 | A1 | 1/2018 |
| JP | 2019-74074 | A | 5/2019 |
| KR | 10-2013-0115175 | A | 10/2013 |
| KR | 10-1655201 | B1 | 9/2016 |
| WO | WO 2008/138960 | A1 | 11/2008 |
| WO | WO 2012/152498 | A1 | 11/2012 |
| WO | WO 2013/087663 | A1 | 6/2013 |
| WO | WO-2016009082 | A1 * | 1/2016 ......... B01D 53/9431 |

OTHER PUBLICATIONS

International Search Report dated Jun. 30, 2020 in PCT/EP2020/065111 filed on Jun. 1, 2020, 2 pages.

Written Opinion dated Jun. 30, 2020 in PCT/EP2020/065111 filed on Jun. 1, 2020, 3 pages.

Japanese Office Action dated Jul. 4, 2022 in Japanese Patent Application No. 2021-570969 (with unedited computer generated English Translation), 5 pages.

* cited by examiner

ATTACHMENT DEVICE FOR A MODULE FOR DISPENSING AN AQUEOUS SOLUTION CONTAINED IN A TANK ON BOARD A MOTOR VEHICLE

This application is a National Stage (371) of PCT/EP2020/065111, filed Jun. 1, 2021, which claims priority to FR 1905826, filed May 31, 2019.

The invention relates to an attachment device for a module for dispensing an aqueous solution contained in a tank on board a motor vehicle, to a module for dispensing an aqueous solution contained in a tank on board a motor vehicle comprising said attachment device, and to an aqueous solution tank on board a vehicle comprising said module. Specifically, the invention relates to a method for producing an attachment device for a module for dispensing an aqueous solution contained in a tank on board a motor vehicle.

The invention can be used in particular in the field of depollution of motor vehicle exhaust gases, which requires the use of a urea solution, but also in the field of water injection into the air intake circuit of a vehicle engine. In the case of water injection, this water mixes with the intake gas and makes it possible to reduce combustion temperatures and emissions of what are known as NOx pollutants, and to increase the performance of a gasoline engine, for example, by reducing the sensitivity to knocking.

The urea solution begins to freeze when the temperature drops below −11° C., and below 0° C. for water. As a result, the system for storing an aqueous solution for a motor vehicle comprises heating means in the tank which are provided to prevent the urea solution or the water, preferably demineralized water, from freezing.

However, these heating means are deactivated when the vehicle is stopped after a period of driving and, when the vehicle is parked outside in severe external winter conditions, which may reach temperatures on the order of −40° C., for example, the urea solution or water, preferably demineralized water, contained in the tank begins to transform into ice and can lead to all of the urea solution or water, preferably demineralized water, freezing within a few tens of minutes.

It is therefore essential to have a heating means inside the tank which is capable of rapidly thawing the water or urea located near the module for dispensing an aqueous solution.

WO 2008/138960 discloses a module for dispensing an aqueous urea solution which comprises a flexible heating means. Such a flexible heater poses the problem of its attachment within the module, but also of the attachment of said module to the tank, as the flexible heater may be damaged when mounting the module for dispensing an aqueous urea solution within the tank.

U.S. Pat. No. 9,702,287 B2 discloses an attachment device for a module for dispensing an aqueous urea solution contained in a tank on board a motor vehicle, said attachment device comprising a non-flexible heating means, said heating means consisting of a heat diffuser comprising at least one heating element of the PTC type (positive temperature coefficient). The non-flexible heating means disclosed in U.S. Pat. No. 9,702,287 B2 is overmolded with an HDPE plastic material. The module for dispensing an aqueous urea solution does not comprise the heat diffuser, either in whole or in part. Such a module has the disadvantage of requiring a large number of sealing means between the different parts of the module and requires the presence of an additional heater.

The object of the invention is in particular to overcome these drawbacks of the prior art.

Specifically, one object of the invention, in at least one of its embodiments, is to provide an attachment device for a module for dispensing an aqueous solution contained in a tank on board a motor vehicle which requires a reduced number of accessories, including sealing means or heating means.

Another object of the invention, in at least one of its embodiments, is to provide a module for dispensing an aqueous solution contained in a tank on board a motor vehicle, but also an aqueous solution tank for a motor vehicle.

Another object of the invention, in at least one of its embodiments, is to implement a method for producing an attachment device for a module for dispensing an aqueous solution contained in a tank on board a motor vehicle.

In accordance with a particular embodiment, the invention relates to an attachment device for a module for dispensing an aqueous solution contained in a tank on board a motor vehicle.

According to the invention, such an attachment device comprises a pump stator, a heating means and a heat diffuser which comprises a base and a first plurality of walls that are substantially vertical with respect to said base and define at least one first internal volume, said base and/or at least one wall that is substantially vertical with respect to the base comprising at least one means for positioning the pump stator and/or a first means for attaching the pump stator and/or at least one second means for attaching the heating means, the pump stator and heat diffuser assembly being overmolded with a plastic material, the attachment device comprising at least one first through-hole, preferably in the region of the base of the attachment device, more preferably in the region of the heat diffuser, suitable for discharging the aqueous solution pumped by the pump, and a second through-hole suitable for supplying the pump with aqueous solution.

The general principle of the invention is based on optimizing the diffusion of the heat emitted by the heating means, but also by the stator of the pump, which also allows a reduction in the number of sealing means such as gaskets, for example.

Thus, the invention is based on a completely novel and inventive approach for producing an attachment device for a module for dispensing an aqueous solution contained in a tank on board a motor vehicle, consisting of an assembly which is overmolded with a plastic material and comprises a pump stator and a heat diffuser, the attachment device comprising at least one first through-hole, preferably in the region of the base of the attachment device, suitable for discharging the water pumped by the pump, said heat diffuser comprising at least one first means for attaching the pump stator and/or at least one second means for attaching the heating means.

The expression "a first plurality of walls that are substantially vertical with respect to said base and define at least one first internal volume" means that the base and the first plurality of walls that are substantially vertical with respect to the base form a contour of which the upper part corresponds to the plane passing through the greatest number of upper edges of the substantially vertical walls of the first plurality of substantially vertical walls, said contour defining a first internal volume in combination with the base and the first plurality of substantially vertical walls. According to an alternative, the upper edges of the plurality of walls that are substantially vertical with respect to the base can be interconnected in whole or in part by a cover. Said first plurality of substantially vertical walls can consist of substantially vertical walls in continuity with one another or of substantially vertical walls which are partially or totally discontinuous from one another, such as walls provided with slots over part or all of their height, said height being defined relative to the base. In the case of a first plurality of substantially vertical walls having one or more discontinuities, the first internal volume is defined by all the substantially vertical walls constituting said first plurality, the voids between the walls being replaced by imaginary walls, and the first internal volume also being defined by the base and by the upper part that corresponds to the plane passing through the greatest number of upper edges of the substantially vertical walls of the first plurality of substantially vertical walls.

The expression "aqueous solution" means an aqueous solution containing urea or water, preferably demineralized water. The expression "demineralized water" means an aqueous solution having an electrical conductivity less than or equal to 100 µS/cm at 25° C., or even less than or equal to 50 µS/cm at 25° C., preferably less than or equal to 5 µS cm at 25° C.

The concepts of lower or upper are defined in relation to the final location of the attachment device within the vehicle and are defined with reference to the ground, with a lower edge of an element being closer to the ground than an upper edge of the same element or wall.

The "at least one substantially vertical wall comprising at least one means for positioning the pump stator and/or a first means for attaching the pump stator and/or at least one second means for attaching the heating means" can be a wall forming part of the first plurality of walls that are substantially vertical with respect to said base and define at least one first internal volume or it may be distinct from this first plurality of substantially vertical walls. When the substantially vertical wall is distinct from the first plurality of substantially vertical walls, said substantially vertical wall may be in the form of a lug for insertion into a receiving area for said lug within the pump stator. Alternatively, when the substantially vertical wall is distinct from the first plurality of substantially vertical walls, said substantially vertical wall may be in the form of a receiving area suitable for receiving a lug present on the pump stator.

Advantageously, the attachment device for a module for dispensing an aqueous solution contained in a tank on board a motor vehicle according to the invention is such that the heating means is selected from a heating resistor, a heating element of the PTC type (positive temperature coefficient) and a circulation loop for a heat transfer fluid, preferably a heating element of the PTC type (positive temperature coefficient).

The circulation loop for the heat transfer fluid thus makes it possible to deliver significant power with a fluid of which the inlet temperature is "regulated" (typically to a maximum of 120° C.). PTCs allow high power to be integrated and make it possible to benefit from self-regulation according to the temperature of the module, the aqueous solution and the filling level (to avoid the risk of overheating and degradation of components).

According to a preferred embodiment, the attachment device for a module for dispensing an aqueous solution contained in a tank on board a motor vehicle according to the invention is such that at least one element of the pump stator is in contact with the heat diffuser.

Such an embodiment thus makes it possible to recover the energy dissipated by the heating of the pump and use it to heat the aqueous solution.

The expression "at least one element of the pump stator is in contact with the heat diffuser" means that at least one element of the pump stator touches the heat diffuser.

According to a preferred embodiment, the attachment device for a module for dispensing an aqueous solution contained in a tank on board a motor vehicle according to the invention is such that the pump stator, the heating means and the heat diffuser, which comprises a base and a first plurality of walls that are substantially vertical with respect to said base and define at least one first internal volume, said base and/or at least one substantially vertical wall comprising at least one first means for attaching the pump stator and/or at least one second means for attaching the heating means, are overmolded with a plastic material.

Thus, such an embodiment makes it possible both to limit the number of sealing and attachment areas and to have the electrical connections for the stator and the heating means in a "dry area."

The expression "dry area" means that the aqueous solution is not present in said area.

According to a preferred embodiment, the attachment device for a module for dispensing an aqueous solution contained in a tank on board a motor vehicle according to the invention is such that it comprises, on an outer part, an end piece which is in fluid communication with the first through-hole suitable for evacuating the water pumped by the pump.

The presence of this end piece thus allows for easier attachment of the injection line for the aqueous urea solution in the case of a motor vehicle exhaust gas depollution system or for water in the case of the injection of water into the combustion chamber of a motor vehicle combustion engine.

According to a preferred embodiment, the attachment device for a module for dispensing an aqueous solution contained in a tank on board a motor vehicle according to the invention is such that the second means for attaching the heating means is a receptacle present in at least one wall of the heat diffuser that is substantially vertical with respect to the base, said receptacle not being in contact with the aqueous solution.

The term "receptacle" means that the second means for attaching the heating means is suitable for receiving the heating means. The receptacle can be provided with guide means which allow easy insertion of the heating means. Such a guide means may be a slide system, for example. The receptacle can also include a locking means which prevents easy release of the heating means from the receptacle. The receptacle can be in the form of a pocket.

Thus, the heating means can be easily assembled, before or after the overmolding.

According to a preferred embodiment, the attachment device for a module for dispensing an aqueous solution contained in a tank on board a motor vehicle according to the invention is such that a second plurality of walls that are substantially vertical with respect to said base defines a second internal volume, the second internal volume being part of the first internal volume, said second internal volume serving as a housing for the pump stator.

The expression "a second plurality of walls that are substantially vertical with respect to said base defines a second internal volume" means that the base and the second plurality of walls that are substantially vertical with respect to the base form a contour of which the upper part corresponds to the plane passing through the greatest number of upper edges of the substantially vertical walls of the second plurality of substantially vertical walls, said contour defining a second internal volume in combination with the base and the second plurality of substantially vertical walls. Said second plurality of substantially vertical walls can consist of substantially vertical walls in continuity with one another or of substantially vertical walls which are partially or totally discontinuous from one another, such as walls provided with slots over part or all of their height, said height being defined relative to the base. Preferably, the second plurality of substantially vertical walls consists of substantially vertical walls in continuity with one another. In the case of a second plurality of substantially vertical walls having one or more discontinuities, the second internal volume is defined by all the substantially vertical walls constituting said second plurality, the voids between the walls of the second plurality being replaced by imaginary walls, and the second internal volume also being defined by the base and by the upper part that corresponds to the plane passing through the greatest number of upper edges of the substantially vertical walls of the second plurality of substantially vertical walls.

Such an embodiment thus makes it possible to optimize the pumping and the heating of the aqueous solution. In such an embodiment, the pump stator is forcibly inserted into the second internal volume, the dimensions of said pump stator being such that its volume is substantially equal to said second internal volume.

According to a preferred embodiment, the attachment device for a module for dispensing an aqueous solution contained in a tank on board a motor vehicle according to the invention is such that the first plurality of substantially vertical walls comprises at least one housing suitable for receiving a connection for a jet pump.

The jet pump thus makes it possible to fill the first internal volume in order to ensure the pumping of the aqueous solution.

The "dynamic dead volume" is reduced through the use of the substantially vertical walls and the jet pump. The expression "dynamic dead volume" means the volume of aqueous solution that cannot be "drawn off" in the tank under driving conditions (when there are movements of liquid toward the eccentric areas of the tank). The addition of a "bowl" or "trap" created by the presence of the first plurality of substantially vertical walls around the pump makes it possible to reduce this dynamic dead volume by keeping part of the aqueous solution in this "bowl" or "trap."

According to a preferred embodiment, the attachment device for a module for dispensing an aqueous solution contained in a tank on board a motor vehicle according to the invention is such that the first plurality of substantially vertical walls and/or the base of the heat diffuser comprises at least one fourth overmolding through-hole.

The thermal contact between the diffuser and the plastic material is thus ensured by mechanically anchoring the plastic material to the diffuser. The fourth overmolding through-hole is intended solely for improved mechanical adhesion between the plastic material and the heat diffuser. The fourth overmolding through-hole is no longer visible once the overmolding with the plastic material has been completed and the attachment device for a module for dispensing an aqueous solution contained in a tank on board a motor vehicle has been formed.

According to a preferred embodiment, the attachment device for a module for dispensing an aqueous solution contained in a tank on board a motor vehicle according to the invention is such that it comprises a means for attachment to said tank, said attachment means being selected from a welding track, a cam lock interface, a Mason jar, or a mechanical assembly with a seal, the means for attachment to said tank preferably being a welding track.

Welding via the welding track thus makes it possible to reduce the number of components and therefore to reduce costs, but also results in a more compact system, since the welding interface is also more compact than a mechanical assembly.

According to a preferred embodiment, the attachment device for a module for dispensing an aqueous solution contained in a tank on board a motor vehicle according to the invention is such that the heat diffuser, which comprises a base and a first plurality of walls that are substantially vertical with respect to said base and define at least one first internal volume, the first means for attaching the pump stator and the second means for attaching the heating means, is made in one piece.

The diffuser thus consists of a single piece, which reduces costs and simplifies positioning and maintenance in the overmolding mold.

According to a preferred embodiment, the attachment device for a module for dispensing an aqueous solution contained in a tank on board a motor vehicle according to the invention is such that the heat diffuser, which comprises a base and a first plurality of walls that are substantially vertical with respect to said base and define at least one first internal volume, is based on aluminum, preferably anodized aluminum.

The expression "based on aluminum" means that the diffuser comprises at least 50 wt. % aluminum, preferably 75 wt. % aluminum, more preferably 90 wt. % aluminum.

The thermal conductivity and the processing properties of the diffuser are thus optimized.

According to a preferred embodiment, the attachment device for a module for dispensing an aqueous solution contained in a tank on board a motor vehicle according to the invention is such that the second through-hole suitable for supplying the pump with aqueous solution is located in an upper part of the first plurality of walls that are substantially vertical with respect to said base and define at least one first internal volume. Preferably, the periphery of the second through-hole consists of the upper edges of the first plurality of walls that are substantially vertical with respect to said base.

Such an embodiment thus allows the overflow of the solution sucked in by the jet pump during operation, the expansion of the ice during freezing and the direct filling of the first internal volume during the filling when the filling means opens out above the module.

According to an alternative embodiment to the preceding embodiment, the attachment device for a module for dispensing an aqueous solution contained in a tank on board a motor vehicle according to the invention is such that the second through-hole suitable for supplying the pump with aqueous solution is located on a wall of the first plurality of walls that are substantially vertical with respect to said base and define at least one first internal volume.

Such an embodiment thus makes it possible to ensure a minimum level of filling of the module if the filling means does not open out above the module. The size of the opening is determined in order to limit the flow rate out of the first internal volume during operation, typically to approximately 10 kg/h.

According to a preferred embodiment, the attachment device for a module for dispensing an aqueous solution contained in a tank on board a motor vehicle according to the invention is such it comprises a third through-hole suitable for supplying the pump with aqueous solution, said third through-hole being located on a wall of the first plurality of walls that are substantially vertical with respect to said base and define at least one first internal volume.

This third through-hole can thus be connected to the suction area of the jet pump in order to draw the aqueous solution located around the first internal volume into the module.

According to a preferred embodiment, the attachment device for a module for dispensing an aqueous solution contained in a tank on board a motor vehicle according to the invention is such that it comprises a common electrical connection means for the assembly consisting of the heating means and the pump.

This connection means can thus be used to connect the module to the vehicle's electrical system, resulting in a smaller size and lower costs.

The plastic overmolding material is a plastic material selected from the group of plastic materials based on polyoxymethylene (POM), polyphenylene sulfide (PPS), polyamide (PA) such as polyphthalamide (PPA), polyetheretherketone (PEEK), polyamide imide (PAI), polyaryletherketone (PAEK), polyketone (PK) or polyolefin, preferably polyethylene (PE), more preferably high-density polyethylene (HDPE). When the means for attaching the attachment device for a module for dispensing an aqueous solution contained in a tank on board a motor vehicle to said tank is a welding track, the plastic material selected will be a material that is chemically compatible with the plastic material constituting the tank, such as a polyolefin, preferably polyethylene (PE), more preferably high-density polyethylene (HDPE).

The expression "group of plastic materials based on" means that the plastic material comprises at least 50 wt. % of the selected plastic material.

A plastic material that is "chemically compatible" with another plastic material means that the plastic materials each comprise chemical species that can be welded together without requiring additional material. In other words, chemically compatible plastic materials are capable of bonding closely together by melting, and in particular of producing a molecular entanglement of their respective polymer chains. Welding the two plastic materials means bringing the two plastic materials into contact in such a way that the self-adhesion phenomenon occurs at the point of contact. The self-adhesion phenomenon occurs when heat is applied to the point of contact. An operation for welding two materials under the action of heat is called thermowelding. In the following, "welding" is used synonymously with "thermowelding."

"Molecular entanglement of polymer chains" of one plastic material and another plastic material means two plastic materials pressed together in such a way that a self-adhesion phenomenon occurs. Self-adhesion of this kind is the phenomenon describing the intermolecular diffusion and entanglement of molecular chains across a polymer interface, resulting in a strong bond. Unlike adhesion, which concerns surface energy (or secondary chemical bonds between two materials that are either similar or not similar), self-adhesion concerns the entanglement of molecular chains and secondary bonds for polymer chains of similar materials, i.e. chemically compatible materials. Under ideal conditions, the diffusion is complete when the interface between the two polymer materials is no longer discernible from the bulk of each of the two polymer materials. For example, in the case of two thermoplastic polymer materials, once thermoplastic polymer to thermoplastic polymer contact is achieved at the interface, the intermolecular diffusion and entanglement is required to complete the process and produce a good weld. A self-adhesion phenomenon of this kind is described, for example, in the publication "Plastics and Composites Welding Handbook," ISBN 1-56990-313-1, page 23.

The concepts of the base, the substantially vertical wall and the through-hole are shared by the heat diffuser and the attachment device for a module for dispensing an aqueous solution contained in a tank on board a motor vehicle. However, a distinction should be made for the concept of a fourth through-hole, which is specific to the heat diffuser, said hole(s) being filled with plastic after overmolding. It is obvious to a person skilled in the art that a specific wall or walls that is/are substantially vertical with respect to the base and are present in the attachment device may be absent from the heat diffuser inserted therein by overmolding.

A second object of the invention is to provide a module for dispensing an aqueous solution contained in a tank on board a motor vehicle comprising an attachment device according to the invention, said module comprising a pump rotor inserted within the pump stator.

A third object of the invention relates to a tank comprising a module for dispensing an aqueous solution contained in a tank on board a motor vehicle according to the invention.

The invention also relates to a method for producing an attachment device for a module for dispensing an aqueous solution contained in a tank on board a motor vehicle, comprising at least the steps of:

producing a heat diffuser which comprises a base and a first plurality of walls that are substantially vertical with respect to said base and define at least one first internal volume;

placing a pump stator within the first internal volume;

overmolding, preferably with a plastic material, the pump stator and heat diffuser assembly which comprises a base and a first plurality of walls that are substantially vertical with respect to said base and define at least one first internal volume.

The step of producing the heat diffuser comprises a shaping step, which can be done by stamping, bending, cutting and welding or by die-casting. Preferably, the shaping step is carried out by die-casting.

The step of placing the stator within the first internal volume can include inserting the pump stator by force fitting, the dimensions of the pump stator being substantially equal to the dimensions of the first means for attaching the pump stator, specifically when the first means for attaching the pump stator corresponds to a second plurality of walls that are substantially vertical with respect to the base and define a second internal volume. In this case, the means for positioning the pump stator and the first means for attaching the pump stator are combined and consist of a second plurality of walls that are substantially vertical with respect to the base and define a second internal volume.

The overmolding step can also include overmolding the one or more heating means integrated into the pump stator and heat diffuser assembly, said one or more heating means being placed in the receptacle(s) provided for this purpose.

LIST OF FIGURES

Other features and advantages of the invention will become clear on reading the following description of a preferred embodiment, given merely as an illustrative and non-limiting example, and the appended drawings, in which:

[FIG. 1] shows an attachment device for a module for dispensing an aqueous solution contained in a tank on board a motor vehicle according to the invention.

Figure 2:
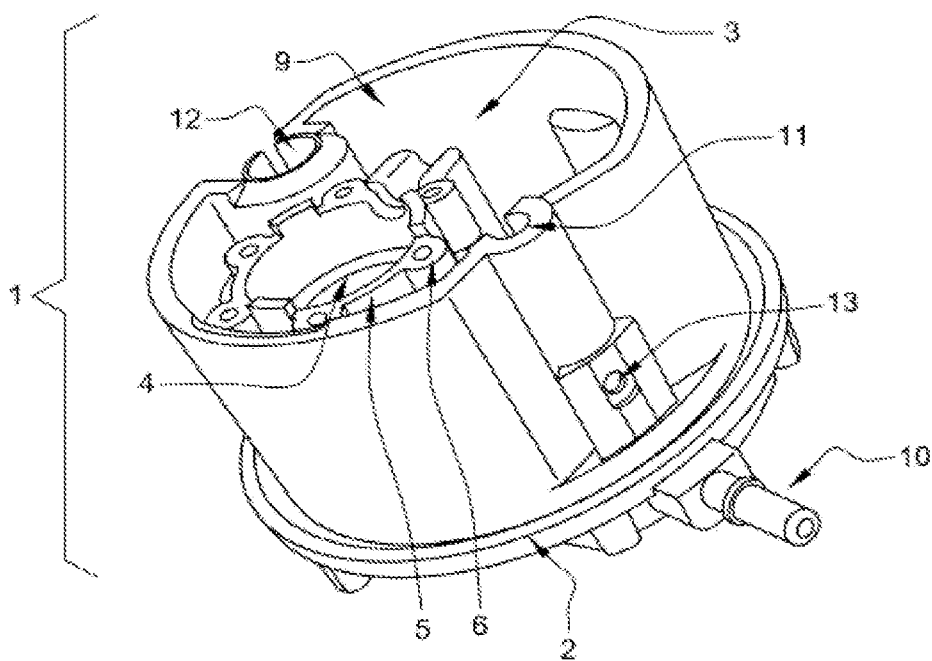

[FIG. 2] is a side view of the attachment device for a module for dispensing an aqueous solution contained in a tank on board a motor vehicle according to the invention shown in FIG. 1.

Figure 3:
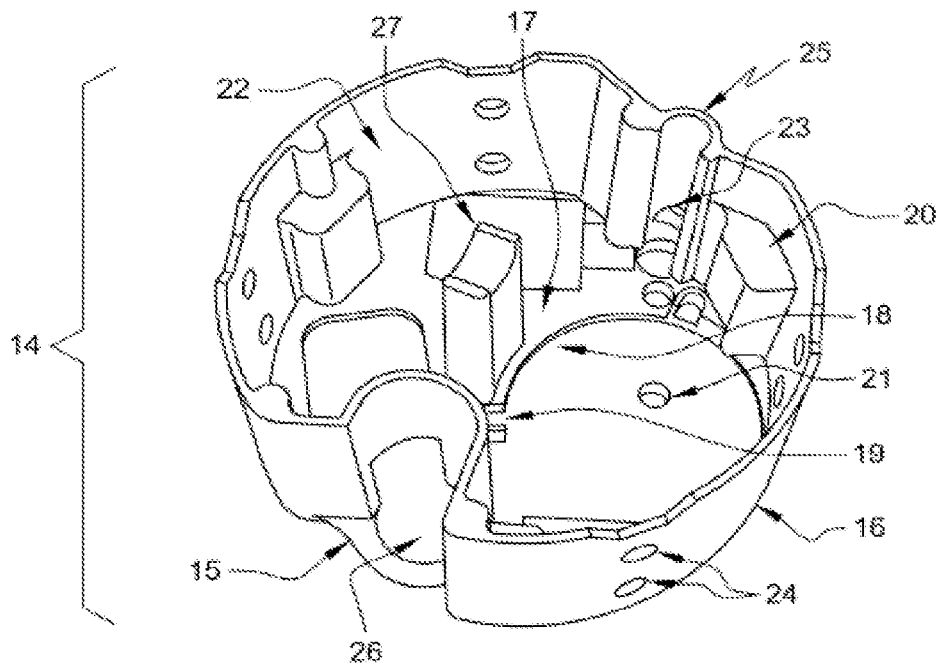

[FIG. 3] shows a heat diffuser seen before overmolding with a plastic material, said diffuser being incorporated in the attachment device for a module for dispensing an aqueous solution contained in a tank on board a motor vehicle according to the invention shown in FIGS. 1 and 2.

Figure 4:
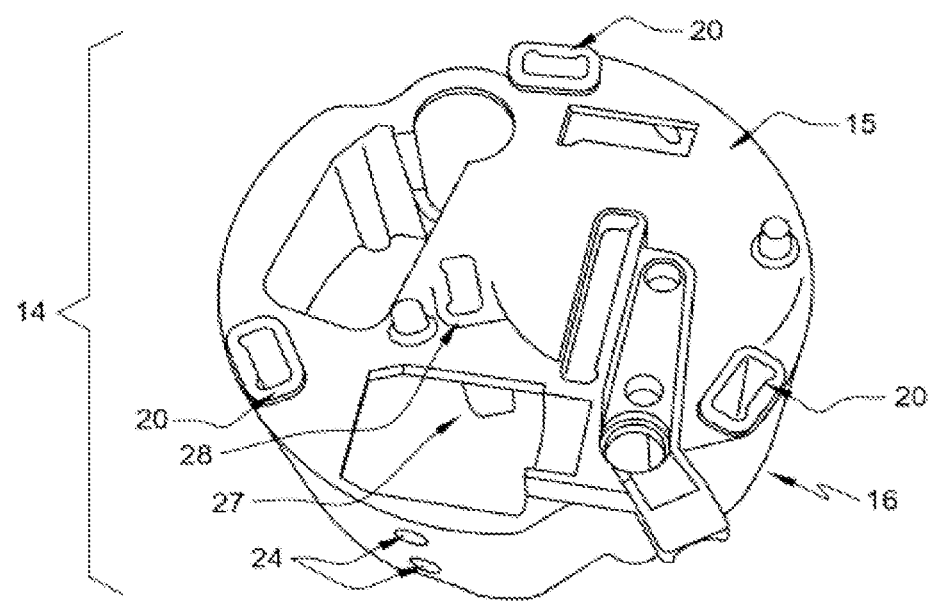

[FIG. 4] shows the heat diffuser of FIG. 3 viewed from its base.

Figure 5:
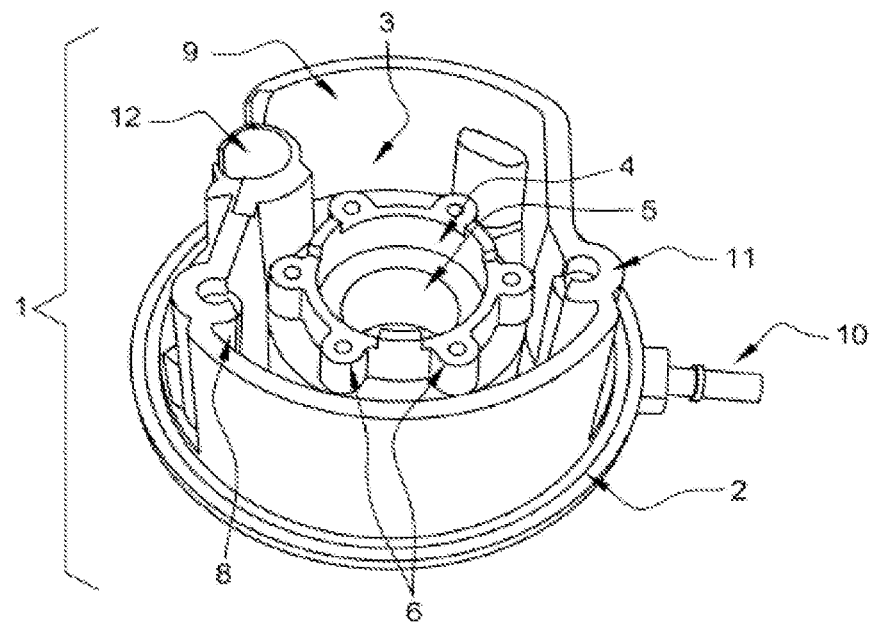

[FIG. 5] shows another embodiment of the attachment device for a module for dispensing an aqueous solution contained in a tank on board a motor vehicle according to the invention.

Figure 6:
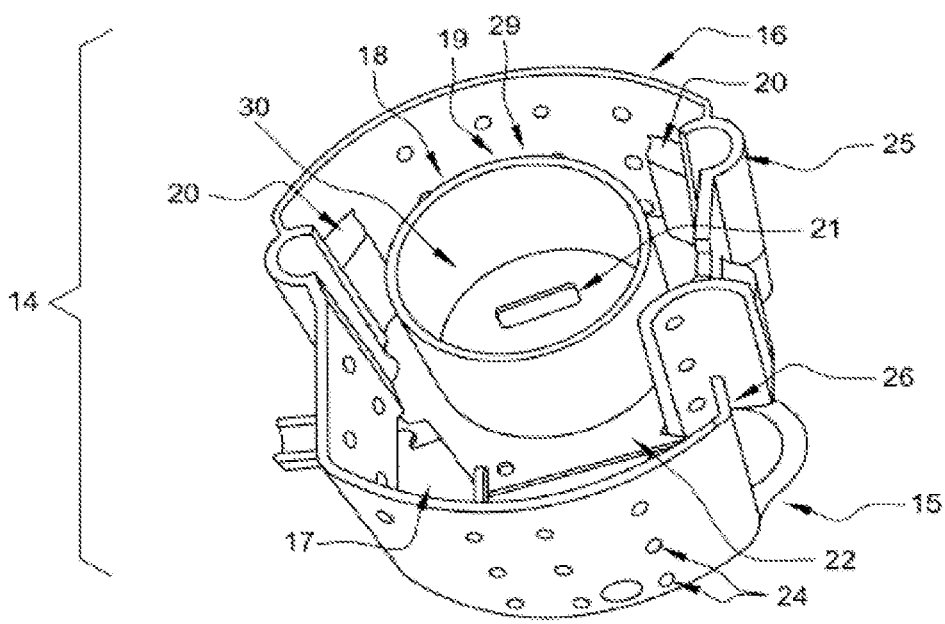

[FIG. 6] shows a heat diffuser seen before overmolding with a plastic material, said diffuser being incorporated in the attachment device for a module for dispensing an aqueous solution contained in a tank on board a motor vehicle according to the invention shown in FIG. 5.

Figure 7:
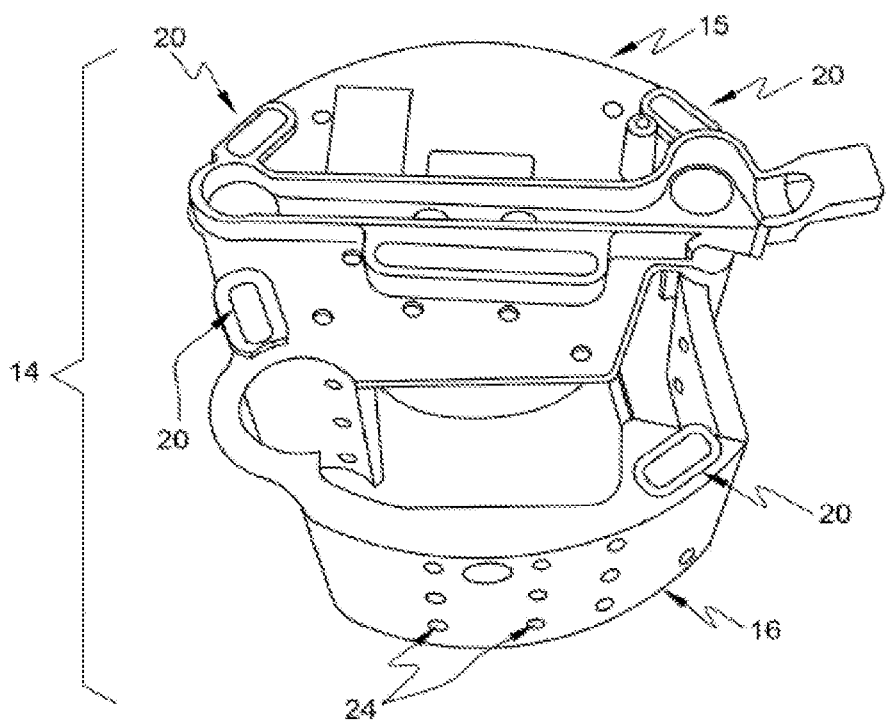

[FIG. 7] is a view from the base of the heat diffuser of FIG. 6.

Figure 8:
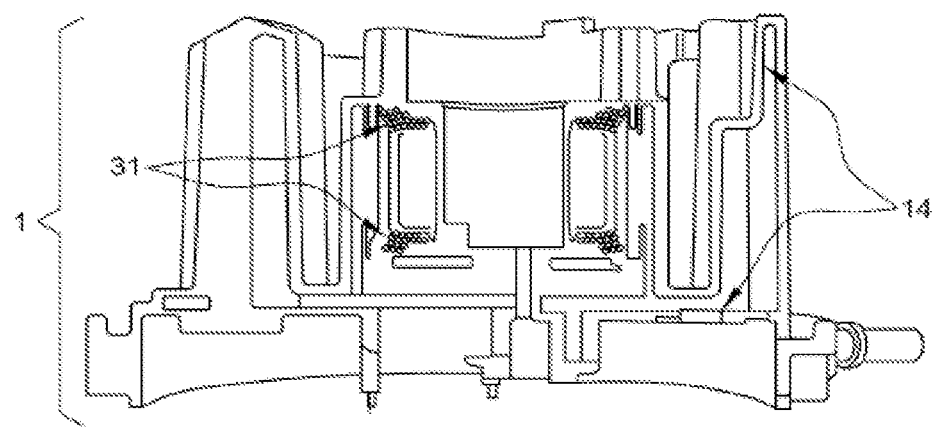

[FIG. 8] is a cross section of the attachment device for a module for dispensing an aqueous solution contained in a tank on board a motor vehicle according to the invention shown in FIG. 5.

DESCRIPTION OF AT LEAST ONE EMBODIMENT OF THE INVENTION

Referring to FIG. 1, an embodiment of an attachment device 1 for a module for dispensing an aqueous solution contained in a tank on board a motor vehicle according to the invention is shown. The attachment device 1 comprises a means 2 for attachment to the tank, said attachment means 2 being a welding track. The attachment device 1 also comprises at least one first internal volume 3 and a second internal volume 4, the second internal volume 4 comprising the pump stator as well as an area 5 for inserting the pump rotor and means 6 for attaching said pump rotor. The attachment device 1 comprises at least one first through-hole 7 in the region of the base 8 of the attachment device, suitable for discharging the aqueous solution pumped by the pump, and a second through-hole 9 suitable for supplying the pump with aqueous solution. The first through-hole 7 is in fluid communication with an outer part forming an end piece 10. The second through-hole 9 suitable for supplying the pump with aqueous solution is located in an upper part of the first internal volume, and the periphery of the second through-hole 9 consists of the upper edges of the first plurality of walls that are substantially vertical with respect to the base 8. The attachment device 1 also comprises a housing 11 suitable for receiving a connection for a jet pump. It can also be provided with a focusing tube 12 for a level sensor.

FIG. 2 is a side view of the attachment device 1 for a module for dispensing an aqueous solution contained in a tank on board a motor vehicle according to the invention shown in FIG. 1. It can be seen that the attachment device 1 comprises a means 2 for attachment to the tank, said attachment means 2 being a welding track. The attachment device 1 also comprises at least one first internal volume 3 and a second internal volume 4, the second internal volume 4 comprising the pump stator as well as an area 5 for inserting the pump rotor and means 6 for attaching said pump rotor. A first through-hole 7 is in fluid communication with an outer part forming an end piece 10. A second through-hole 9 allows the pump to be supplied with aqueous solution. The second through-hole 9 suitable for supplying the pump with aqueous solution is located in an upper part of the first internal volume, and the periphery of the second through-hole 9 consists of the upper edges of the first plurality of walls that are substantially vertical with respect to the base. The attachment device 1 also comprises a housing 11 suitable for receiving a connection for a jet pump. It can also be provided with a focusing tube 12 for a level sensor. The attachment device 1 is also provided with a third through-hole 13 suitable for supplying the pump with aqueous solution, said third through-hole 13 being located on a wall of the first plurality of walls that are substantially vertical with respect to said base and define at least one first internal volume 3. This third through-hole is connected to the suction area of the jet pump in order to draw the aqueous solution located around the first internal volume 3 into the module.

FIG. 3 shows a heat diffuser 14 seen before overmolding with a plastic material, said heat diffuser 14 being incorporated in the attachment device for a module for dispensing an aqueous solution contained in a tank on board a motor vehicle according to the invention shown in FIGS. 1 and 2. The heat diffuser 14 comprises a base 15 and a first plurality of walls 16 that are substantially vertical with respect to said base 15 and define at least one first internal volume 17, said base 15 comprising at least one means 18 for positioning the pump stator and a first means 19 for attaching the pump stator. At least one wall 16 of the heat diffuser 14 that is substantially vertical with respect to the base 15 comprises at least one second means 20 for attaching the heating means, and the heat diffuser 14 comprises at least one first through-hole 21, preferably in the region of the base 15, and a second through-hole 22. The second through-hole 22 is located in an upper part of the first internal volume 17, and the periphery of the second through-hole 22 consists of the upper edges of the first plurality of walls 16 that are substantially vertical with respect to the base 15. The heat diffuser 14 is also provided with a third through-hole 23, said third through-hole 23 being located on a wall of the first plurality of walls 16 that are substantially vertical with respect to the base 15 and define the first internal volume 17. The heat diffuser 14 is provided with at least one fourth overmolding through-hole 24, preferably with a plurality of fourth overmolding through-holes 24, in the region of the first plurality of substantially vertical walls 16 and/or of the base 15 of the heat diffuser 14. The first plurality of walls 16 that are substantially vertical with respect to the base 15 also comprises a housing 25 suitable for receiving a connection for a jet pump when the heat diffuser is overmolded, said housing 25 being in the form of a groove. The first plurality of substantially vertical walls also comprises a housing 26 suitable for forming a focusing tube for a level sensor. The heat diffuser 14 also comprises a third plurality of walls 27 that are substantially vertical with respect to the base 15, said third plurality of substantially vertical walls 27 being closed at the top and comprising a fourth attachment means suitable for serving as a housing for a heating means located near the pump stator.

FIG. 4 shows the heat diffuser 14 of FIG. 3 viewed from its base 15. The first plurality of substantially vertical walls 16 comprises at least one second means 20 for attaching the heating means. The heat diffuser 14 also comprises a third plurality of substantially vertical walls 27, said third plurality of substantially vertical walls 27 being closed at the top and comprising a fourth attachment means 28 suitable for serving as a housing for a heating means located near the pump stator. It can be seen that the first plurality of walls 16 that are substantially vertical with respect to the base 15 has a plurality of fourth overmolding through-holes 24.

FIG. 5 shows another embodiment of the attachment device 1 for a module for dispensing an aqueous solution contained in a tank on board a motor vehicle according to the invention. The attachment device 1 comprises a means 2 for attachment to the tank, said attachment means 2 being a welding track. The attachment device 1 also comprises at least one first internal volume 3 and a second internal volume 4, the second internal volume 4 comprising the pump stator as well as an area 5 for inserting the pump rotor and means 6 for attaching said pump rotor. The attachment device 1 comprises at least one first through-hole (not shown in the figure) in the region of the base 8 of the attachment device, suitable for discharging the aqueous solution pumped by the pump, and a second through-hole 9 suitable for supplying the pump with aqueous solution. The first through-hole is in fluid communication with an outer part forming an end piece 10. The second through-hole 9 suitable for supplying the pump with aqueous solution is located in an upper part of the first internal volume, and the periphery of the second through-hole 9 consists of the upper edges of the first plurality of walls that are substantially vertical with respect to the base 8. The attachment device 1 also comprises a housing 11 suitable for receiving a connection for a jet pump. It can also be provided with a focusing tube 12 for a level sensor.

FIG. 6 shows a heat diffuser 14 seen before overmolding with a plastic material, said heat diffuser 14 being incorporated in the attachment device for a module for dispensing an aqueous solution contained in a tank on board a motor vehicle according to the invention shown in FIG. 5. The heat diffuser 14 comprises a base 15 and a first plurality of walls 16 that are substantially vertical with respect to said base 15 and define at least one first internal volume 17, said base 15 comprising at least one means 18 for positioning the pump stator and a first means 19 for attaching the pump stator. The means 18 for positioning the pump stator and the first means 19 for attaching the pump stator are combined and consist of a second plurality of walls 29 that are substantially vertical with respect to the base 15 and define a second internal volume 30, the second internal volume being part of the first internal volume 17, said second internal volume 30 serving as a housing for the pump stator. At least one substantially vertical wall 16 of the heat diffuser 14 comprises at least one second means 20 for attaching the heating means, and the heat diffuser 14 comprises at least one first through-hole 21, preferably in the region of the base 15, and a second through-hole 22. The second through-hole 22 is located in an upper part of the first internal volume 17, and the periphery of the second through-hole 22 consists of the upper edges of the first plurality of walls 16 that are substantially vertical with respect to the base 15. The heat diffuser 14 is provided with at least one fourth overmolding through-hole 24, preferably with a plurality of fourth overmolding through-holes 24, in the region of the first plurality of substantially vertical walls 16 and/or of the base 15 of the heat diffuser 14. The first plurality of walls 16 that are substantially vertical with respect to the base 15 also comprises a housing 25 suitable for receiving a connection for a jet pump when the heat diffuser is overmolded, said housing 25 being in the form of a groove. The first plurality of substantially vertical walls also comprises a housing 26 suitable for forming a focusing tube 12 for a level sensor.

FIG. 7 shows the heat diffuser 14 of FIG. 6 viewed from its base 15. The first plurality of substantially vertical walls 16 comprises at least one second means 20 for attaching the heating means. It can be seen that the first plurality of walls 16 that are substantially vertical with respect to the base 15 has a plurality of fourth overmolding through-holes 24.

FIG. 8 is a cross section of the attachment device 1 for a module for dispensing an aqueous solution contained in a tank on board a motor vehicle according to the invention shown in FIG. 5. This cross-sectional view of the attachment device 1 shows the overmolding of the pump stator 31 and the heat diffuser 14 with the plastic material.

The invention claimed is:

1. An attachment device configured for a module configured for dispensing an aqueous solution contained in a tank on board a motor vehicle, the attachment device comprising:
   a first through-hole suitable for discharging the aqueous solution pumped by a pump,
   a second through-hole suitable for supplying the pump with the aqueous solution,
   a heater;
   an assembly of a pump stator and a heat diffuser, the heat diffuser comprising a base and a first plurality of walls that are substantially vertical with respect to the base and define at least one first internal volume; and
   a second plurality of walls that are substantially vertical with respect to the base defines a second internal volume,
   wherein the base and/or at least one wall that is substantially vertical with respect to the base comprises a volume for positioning the pump stator and/or a first attaching element for the pump stator and/or a second attaching element for the heater,
   wherein the second internal volume is part of the first internal volume,
   wherein the second internal volume serves as a housing for the pump stator, and
   wherein the assembly, of the pump stator and heat diffuser, is overmolded together with a plastic material.

2. The device of claim 1, wherein the heater comprises a heating resistor, a positive temperature coefficient heating element, a circulation loop for a heat transfer fluid, or a combination of two or more of any of these.

3. The device of claim 1, wherein the second attaching element is a receptacle present in at least one of the walls of the heat diffuser that is substantially vertical with respect to the base,
   wherein the receptacle is not in contact with the aqueous solution.

4. The device of claim 1, wherein the first plurality of substantially vertical walls comprises a housing suitable for receiving a connection for a jet pump.

5. The device of claim 1, wherein the first plurality of substantially vertical walls comprises a fourth overmolding through-hole.

6. The device of claim 1, further comprising:
   a tank attachment selected from the group consisting of a welding track, a camlock interface, and a mechanical assembly with a seal.

7. The device of claim 1, wherein the heat diffuser, the first attaching element, and the second attaching element, are made in one piece.

8. The device of claim 1, wherein the heat diffuser comprises at least 50 wt. % aluminum.

9. An apparatus, comprising:
   the attachment device of claim 1;

a module configured for dispensing the aqueous solution in from a tank, wherein the tank is configured to be on board a motor vehicle comprising the attachment device, wherein the module comprises a pump rotor inserted within the pump stator.

10. An aqueous solution tank, comprising the apparatus of claim 9.

11. The device of claim 1, wherein the first plurality of substantially vertical walls and the base of the heat diffuser comprise a fourth overmolding through-hole.

12. The device of claim 1, further comprising a welding track.

13. The device of claim 1, further comprising a camlock interface.

14. The device of claim 1, further comprising a mechanical assembly with a seal.

15. The device of claim 1, wherein the first and second attaching element made in one piece.

16. The device of claim 1, wherein the heat diffuser is comprises at least 75 wt. % aluminum.

17. The device of claim 1, wherein the heat diffuser comprises aluminum.

18. A method for producing an attachment device for a module configured for dispensing an aqueous solution contained in a tank on board a motor vehicle, the method comprising:

producing a heat diffuser comprising a base, a first plurality of walls that are substantially vertical with respect to the base and define at least one first internal volume, and a second plurality of walls that are substantiallyy vertical withe respect to the base defines a second internal volume;

placing a pump stator within the first internal volume;

overmolding together an assembly of the pump stator and heat diffuser with plastic material, wherein the second internal volume is part of the first internal volume, and wherein the second internal volume serves as a housing for the pump stator.

19. The method of claim 18, wherein the first and second attaching element are made in one piece.

* * * * *